US007039090B2

(12) United States Patent
Boetzel et al.

(10) Patent No.: US 7,039,090 B2
(45) Date of Patent: May 2, 2006

(54) METHOD FOR CONTROLLING ANTENNAS OF A RECEIVING DEVICE IN A RADIO SYSTEM

(75) Inventors: Ulrich Boetzel, Kaarst (DE); Christian Kranz, Ratingen Lintorf (DE); Bernd Schmandt, Ratingen (DE)

(73) Assignee: Infineon Technologies AG, Munich (DE)

( * ) Notice: Subject to any disclaimer, the term of this patent is extended or adjusted under 35 U.S.C. 154(b) by 731 days.

(21) Appl. No.: 10/153,044

(22) Filed: May 22, 2002

(65) Prior Publication Data

US 2002/0141374 A1   Oct. 3, 2002

Related U.S. Application Data

(63) Continuation of application No. PCT/DE00/04238, filed on Nov. 27, 2000.

(30) Foreign Application Priority Data

Nov. 30, 1999   (DE)   ................................. 199 57 534

(51) Int. Cl.
*H04B 1/713*   (2006.01)

(52) U.S. Cl. ....................................... 375/134; 375/137
(58) Field of Classification Search ........ 375/132–137, 375/267, 347; 455/101, 277.01
See application file for complete search history.

(56) References Cited

U.S. PATENT DOCUMENTS

| | | | | |
|---|---|---|---|---|
| 6,018,555 | A * | 1/2000 | Mahany | 375/347 |
| 6,243,565 | B1 * | 6/2001 | Smith et al. | 455/101 |
| 6,289,209 | B1 * | 9/2001 | Wood, Jr. | 455/277.1 |
| 6,400,751 | B1 * | 6/2002 | Rodgers | 375/132 |

FOREIGN PATENT DOCUMENTS

| | | |
|---|---|---|
| DE | 197 14 967 A1 | 10/1997 |
| JP | 11 122 153 A | 4/1999 |
| WO | WO 98/27670 | 6/1998 |
| WO | WO 99/09678 | 2/1999 |

OTHER PUBLICATIONS

David, K. et al.: "Digitale Mobilfunksysteme" [Digital Mobile Radio Systems], B. G. Teubner Stuttgart, 1996, pp. 49-57, 271-273, and 353-354.

* cited by examiner

*Primary Examiner*—Don N. Vo
(74) *Attorney, Agent, or Firm*—Laurence A. Greenberg; Werner H. Stemer; Ralph E. Locher

(57) ABSTRACT

A method for controlling antennas of a receiving device in a radio system, especially in a mobile radio system, in which at least one change is made using a frequency hopping method between a number of transmission frequencies that are provided for the transmission of radio signals. A table is formed with data relating to the reception quality of each antenna. This data is evaluated on each change to the transmission frequency, and one of the antennas is selected as a function of the result of the evaluation. The method is especially suitable for use in systems using slow frequency hopping methods (slow frequency hopping systems), such as bluetooth or WDCT systems.

12 Claims, 1 Drawing Sheet

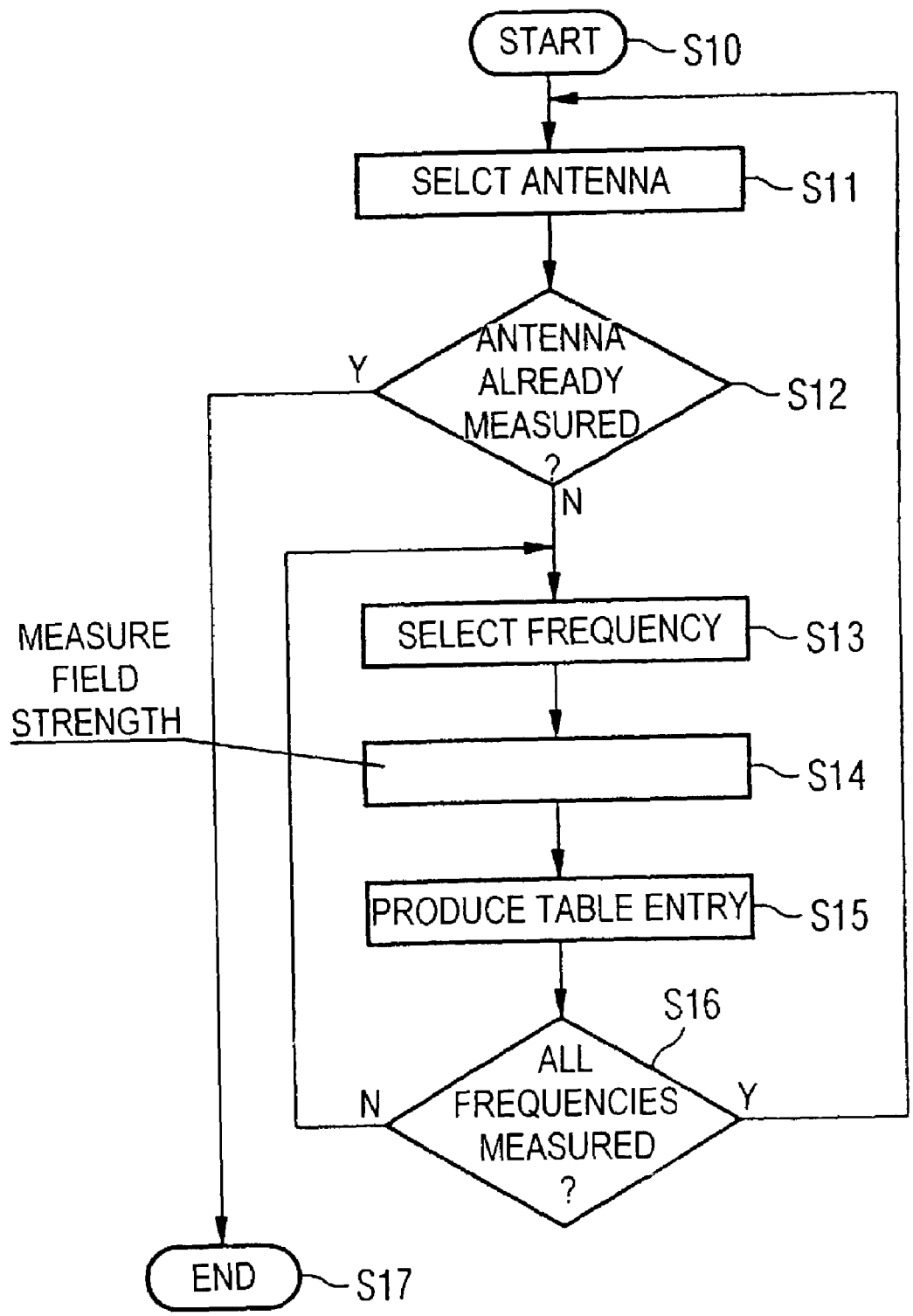

METHOD FOR CONTROLLING ANTENNAS OF A RECEIVING DEVICE IN A RADIO SYSTEM

CROSS-REFERENCE TO RELATED APPLICATIONS

This application is a continuation of copending International Application No. PCT/DE00/04238, filed Nov. 27, 2000, which designated the United States and was not published in English.

BACKGROUND OF THE INVENTION

FIELD OF THE INVENTION

The invention relates to a method for controlling antennas of a receiving device in a radio system, especially a mobile radio system.

In order to achieve good transmission quality and a good radio link between a transmitting and receiving device in a radio system, in particular, between a base station and a mobile station in a mobile radio system, it is known for a number of antennas to be used in the receiving device. The antenna that gives the best reception quality of all of the available antennas is then in each case used for reception (so-called antenna diversity). The various antennas are, of course, also used for transmission. The selection from different antennas is intended to reduce the influx of fading, and in particular, the loss of the signal during transmission, for example as a result of interference on the radio channel. The various antennas must be geometrically separated by a distance which prevents the antennas from influencing one another. Diversity methods are described in paragraph 2.1.7 of K. David, T. Benkner, "Digitale Mobilfunksysteme" [Digital mobile radio systems], Teubner Verlag, 1996. The fundamental idea of a (spatial) diversity method is that the signals which are received via different antennas are not correlated, provided the geometrical distance between the antennas is sufficiently great.

By way of example, a DECT (Digital Enhanced Cordless Telephone) system operates initially on one transmission frequency, that is to say radio signals are transmitted at one selective frequency. The DECT system then changes the transmission frequency by using a so-called handover. Whenever the transmission frequency is changed, the antenna that gives the best reception quality for receiving the radio signals is chosen from a large number of antennas. However, in general two antennas are arranged offset from each other. However, this requires the connection quality to be continuously monitored. That is to say the field strength of the received signals is continuously monitored. If the reception field strength of a selected antenna is below a predetermined strength, a change is made to an antenna whose reception field strength is higher.

SUMMARY OF THE INVENTION

It is accordingly an object of the invention to provide a method for controlling antennas in a receiving device which overcomes the above-mentioned disadvantages of the prior art methods of this general type.

In particular, it is an object of the invention to provide a method for controlling antennas in a receiving device, which can be carried out easily and which can be advantageously used especially for radio systems based on slow frequency hopping methods (slow frequency hopping systems).

With the foregoing and other objects in view there is provided, in accordance with the invention, a method for controlling a plurality of antennas of a receiving device in a radio system. During a radio connection, a frequency hopping method is used to change between a plurality of transmission frequencies that are provided for transmitting radio signals. For each change to a particular one of the transmission frequencies, a table having data relating to a reception quality obtained with each one of the antennas is evaluated. One of the antennas is selected as a function of a result of the step of evaluating the table.

One fundamental idea of the invention is evaluating a table with data relating to the reception quality of each antenna whenever the transmission frequency is changed, and selecting an antenna in a receiving device as a function of the result of the evaluation. Since a table with corresponding data relating to the reception quality of the antennas is maintained, when a change is made to the transmission frequency, the table can be used to select the antenna that gives the best reception quality. Generally this will be the antenna with the highest reception field strength. The data which is associated with the antennas can be based on the reception field strength or the reception power, or on a combination of various parameters for an antenna. The data can expediently be used essentially for evaluating the reception quality of an antenna. One precondition for operating the inventive method is that the radio channel via which the receiving device receives signals only changes slowly. This is because, if a change occurs slowly, the radio channel and the transmission characteristics relating to it scarcely change, and the data stored in the table virtually matches the actual reception characteristics and qualities of the individual antennas. It should also be noted that this method can, of course, advantageously also be used in a transmitting/receiving device, for example a mobile telephone or cordless telephone, that is to say not just in a receiving device.

The table preferably contains data relating to the reception quality of each antenna at each transmission frequency. A large number of table entries, corresponding to the number of transmission frequencies, are provided for each antenna. According to the method, all of the entries in the table associated with a given transmission frequency are then searched when the transmission frequency is changed. During the search, one is looking for the largest entry, corresponding to the antenna with the best reception quality. The antenna associated with this entry is then used for the intended transmission frequency. The search process can be correspondingly shortened by using suitable search algorithms, so that, in particular, there is no interruption in a connection.

Whenever a change is made from a first transmission frequency to a second transmission frequency, the entries in the table corresponding to the second transmission frequency are preferably evaluated such that an antenna with the best reception quality for the second transmission frequency is selected. The best reception quality does not simply relate just to the highest reception field strength, but especially, also to the reception power or to the best signal-to-noise ratio. The table may contain a large number of entries for the second transmission frequency for each antenna, representing widely different parameters of the antenna at the second transmission frequency. A suitable algorithm can then use these parameters for each antenna to calculate a factor that is used for selecting the best antenna for the second transmission frequency.

The reception field strength of each antenna at a given transmission frequency is preferably measured whenever a change is made to this transmission frequency. Corresponding entries for the reception quality are then stored in the table, corresponding to the reception field strength of each antenna at this transmission frequency. This advantageously allows the table entries to be updated continuously. By way of example, the measurement can be carried out immediately after selecting an antenna for that transmission frequency. This may be done, for example, in parallel with the transmission or reception of signals. Changes to the radio channel between a transmission frequency change can, in particular, be taken into account by carrying out the measurement precisely at a time between the times when the transmission frequency changes occur.

The receiving device preferably determines a hopping sequence through the transmission frequencies for a first transmission frequency using a first antenna. All of the entries relating to the reception quality of the first antenna are then determined, followed by those for the reception quality of the other antennas, and these are stored in the table. This results in the formation of a table with data relating to the reception quality. This formation process is preferably carried out when the receiving device is started up, that is to say, for example, when a mobile telephone "registers" in a mobile radio system, or when a cordless telephone is switched on. Once a table has been produced, the inventive method can be used to switch between the individual antennas in an appropriate manner.

The receiving device preferably changes the transmission frequency at least 75 times per second. In the case of the so-called slow frequency hopping method (slow frequency hopping systems), the transmission frequency must be changed at least 75 times per second, in accordance with the FCC (Federal Communication Commission) licensing regulations for radio systems in the 2.4 GHz frequency band.

The table with data relating to the reception quality of each antenna preferably has additional parameters for each antenna and transmission frequency. These additional parameters may, for example, relate to the necessity for selecting a specific antenna for a specific transmission frequency.

The radio system is preferably a WDCT (Wideband Digital Cordless Telephone) or bluetooth radio system. The inventive method can be used particularly advantageously in systems such as these.

The receiving device has, in particular, two antennas which are advantageously arranged differently—for example offset through 90°—on the receiving device. This results in good connection quality for all of the radio system transmission frequencies, with as little complexity as possible.

Other features which are considered as characteristic for the invention are set forth in the appended claims.

Although the invention is illustrated and described herein as embodied in a method for controlling antennas of a receiving device in a radio system, especially a mobile radio system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows a flowchart relating to the formation of a table for carrying out the inventive method.

DESCRIPTION OF THE PREFERRED EMBODIMENTS

Referring now to the figures of the drawing in detail and first, particularly, to FIG. 1 thereof, there is shown a flowchart illustrating the production of a table for using the inventive method. A table such as this must be produced, for example, when switching on or registering a cordless telephone in a cordless telephone system or a mobile telephone in a mobile radio system since, at this time, no information is yet available relating to the connection quality, the radio channel, and the reception quality of the various antennas of a receiving device. In this exemplary embodiment, the receiving device is assigned to be the base station of a cordless telephone based on the WDCT (Wideband Digital Cordless Telephone) Standard. The radio system may, however, also operate just as well in accordance with the Bluetooth Standard. However, one precondition for the correct operation of the inventive method is that the characteristics of the radio channel change only slowly, as is the case in the systems mentioned above. The systems should, furthermore, be slow frequency hopping systems, that is to say they should not change the transmission frequency too often within one second.

The base station has two antennas that are arranged on the base station at a sufficient distance apart from one another, for example, at a distance of several centimeters. Furthermore, the two antennas are advantageously aligned differently, so that signals are received from different reception directions via the antennas. Ideally, the antennas should each receive signals that have arrived on a completely different propagation path.

In step S10, the radio system is started up and the base station and cordless telephones are synchronized to one another. In order to do this, in step S11, the first antenna of the two antennas is selected in accordance with a predetermined algorithm in the base station. That is to say a receiving circuit in the base station is connected to the first antenna for signal reception.

In step S12, the base station checks whether the first antenna has already been measured. Initially, this step is irrelevant, and it becomes important only after a number of antennas have been measured.

A transmission frequency for interchanging the synchronization signals is chosen in step S13. This transmission frequency is generally predetermined. If, for example, ten frequencies are available with a channel separation of 10 MHz starting from 1800 MHz, then the synchronization is carried out at 1800 MHz.

The base station and the cordless telephones now interchange synchronization signals. To do this, the base station sends and receives signals via the first antenna. In step S14, the base station measures the field strength of the received synchronization signals. This may be done just once, or sensibly also more than once, during the synchronization process.

The measured reception field strength is now used to determine a value or factor which is characteristic of the reception quality of the first antenna. If the reception field strength has been measured more than once, a mean value may be formed. In step 15, this value or factor is now entered in a table in which a factor or value such as this is stored by using the algorithm for each of the two antennas, for each transmission frequency.

In step 16, a check is carried out to determine whether all of the available transmission frequencies have already been measured. If this is the case, the process switches to the second antenna, so that the algorithm produces the table entries for this antenna. If the transmission frequencies have not yet all been measured, the algorithm jumps back to step S13, in order to select a new transmission frequency. The transmission frequency is in this case selected on the basis of the conditions predetermined by the radio system.

Once all of the frequencies have been measured for each of the antennas, the table is produced, and the algorithm ends in step S17. When the transmission frequency is changed, the table is now used in the base station to select the antenna whose reception quality is the best on the basis of the stored value or factor. The connection partners, that is to say the cordless telephone and base station, can, for example, also directly agree on using a specific antenna for specific frequencies. To do this, a specific predetermined table entry can be used such that one of the available antennas is always selected for a specific transmission frequency.

We claim:

1. A method for controlling a plurality of antennas of a receiving device in a radio system, which comprises:
   during a radio connection, using a frequency hopping method to change between a plurality of transmission frequencies that are provided for transmitting radio signals;
   for each change to a particular one of the transmission frequencies, evaluating a table having data relating to a reception quality obtained with each one of the antennas; and
   selecting one of the antennas as a function of a result of the step of evaluating the table.

2. The method according to claim 1, wherein: the data in the table relates to the reception quality obtained with each one of the antennas at each one of the transmission frequencies.

3. The method according to claim 2, wherein:
   the step of evaluating the table includes evaluating entries in the table corresponding to a second transmission frequency when changing from a first transmission frequency to the second transmission frequency; and
   the step of selecting the one of the antennas includes selecting an antenna having a best reception quality for the second transmission frequency.

4. The method according to claim 1, which comprises:
   for each change to a particular one of the transmission frequencies, measuring a reception field strength of each one of the antennas at the particular one of the transmission frequencies;
   storing corresponding entries for the reception quality in the table, the entries including information corresponding to the reception field strength of each one of the antennas at the particular one of the transmission frequencies.

5. The method according to claim 1, which comprises:
   using the receiving device to determine a hopping sequence through the transmission frequencies for a first transmission frequency with a first one of the antennas;
   determining all entries relating to the reception quality of the first one of the antennas; and subsequently determining all entries relating to the reception quality of all additional ones of the antennas; and
   storing the entries relating to the reception quality of the first one of the antennas in the table, and storing the storing the entries relating to the reception quality of the additional ones of the antennas in the table.

6. The method according to claim 1, which comprises: using the receiving device to change between the transmission frequencies at least 75 times per second.

7. The method according to claim 1, which comprises: providing the table with additional parameters for each one of the antennas and for each one of the transmission frequencies.

8. The method according to claim 7, wherein: the additional parameters relate to a necessity for selecting a specific one of the antennas for a specific one of the transmission frequencies.

9. The method according to claim 1, which comprises: providing the radio system as a radio system selected from the group consisting of a Wideband Digital Cordless Telephone System and a bluetooth radio system.

10. The method according to claim 1, which comprises: providing the plurality of the antennas as two antennas of the receiving device.

11. The method according to claim 1, which comprises: providing the receiving device as part of a mobile radio system.

12. The method according to claim 1, which comprises:
    using the receiving device to determine a hopping sequence through the transmission frequencies with a first one of the antennas;
    determining all entries relating to the reception quality of the first one of the antennas; and subsequently determining all entries relating to the reception quality of all additional ones of the antennas; and
    storing the entries relating to the reception quality of the first one of the antennas in the table, and storing the storing the entries relating to the reception quality of the additional ones of the antennas in the table.

* * * * *